F. F. GRIFFIN.
GRIP CHAIN FOR TIRES.
APPLICATION FILED JULY 25, 1918.
1,324,395.
Patented Dec. 9, 1919.
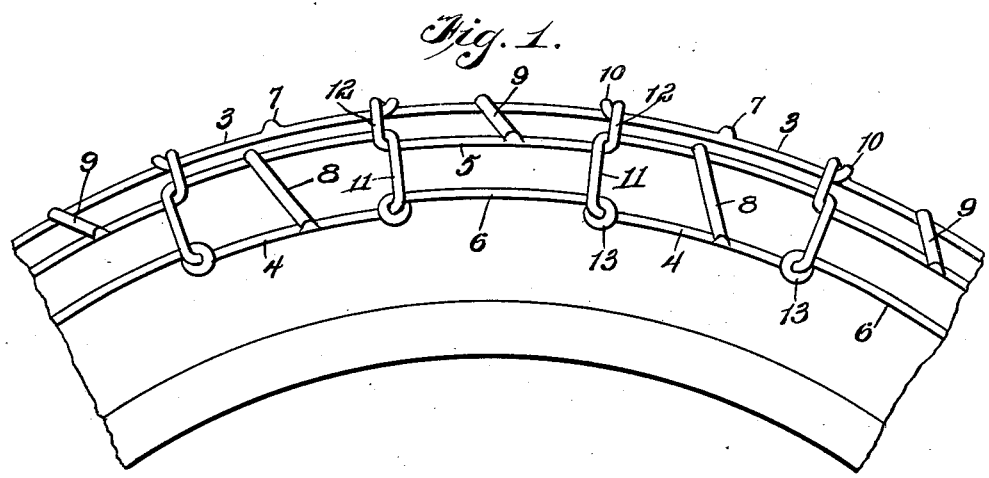
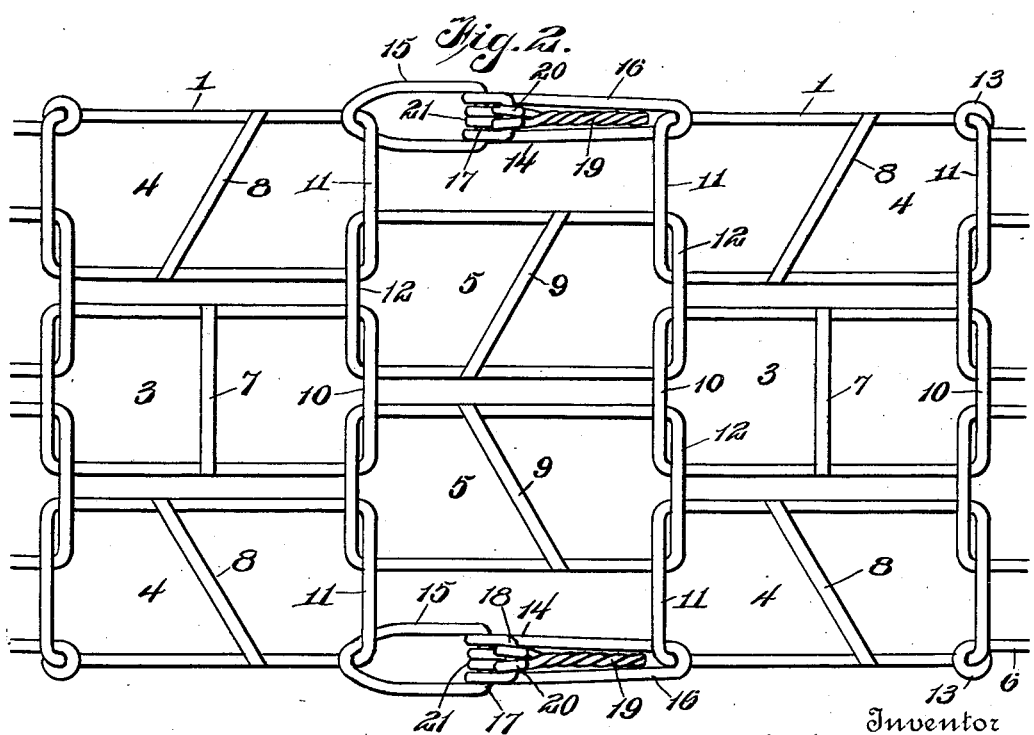
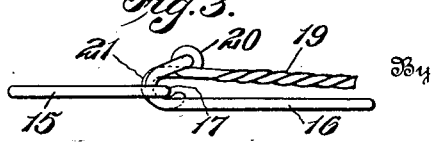
Inventor
F. F. Griffin
By
Attorney

UNITED STATES PATENT OFFICE.

FRANK F. GRIFFIN, OF MONROE, NEW YORK.

GRIP-CHAIN FOR TIRES.

1,324,395.   Specification of Letters Patent.   Patented Dec. 9, 1919.

Application filed July 25, 1918. Serial No. 246,731.

*To all whom it may concern:*

Be it known that I, FRANK F. GRIFFIN, a citizen of the United States, residing at Monroe, in the county of Orange and State of New York, have invented new and useful Improvements in Grip-Chains for Tires, of which the following is a specification.

This invention relates to a novel and improved grip chain for tires, the primary object of the invention being to provide a grip chain which will afford a firm and secure gripping action and which will operate with a minimum degree of wear and tear upon the tire.

A further object of the invention is to provide a grip chain which will have a wide range of radial flexibility, and which will operate to grip the road or street surface on both transverse and oblique lines in such a manner as to prevent skidding or sluing.

The invention consists of the features of construction, combination and arrangement of parts, hereinafter fully described and claimed, reference being had to the accompanying drawing, in which:—

Figure 1 is a side elevation of a portion of a pneumatic-tired wheel and a grip chain embodying my invention.

Fig. 2 is a plan view of a portion of the grip chain on an enlarged scale.

Fig. 3 is a detail side view of one of the chain tightening and loosening links.

In carrying my invention into practice, I provide a grip chain consisting of alternate rows of chain links 1 and 2. These links are preferably made of spring wire or equivalent material, and may embody any desired number of links in each row according to the width of the tire to which the chain is to be applied. In the present instance I have shown each row 1 as consisting of three links, to wit, a central link 3 and side links 4, and each row 2 as consisting of a pair of main links 5 and a pair of side links 6, which links are constructed and combined in a novel manner to secure increased flexibility and a determined gripping action.

The links 3 and 4 are each of oblong rectangular form, and the central link 3 is shown as provided with a central transverse cross bar 7, while the opposed side links 4, which are of duplicate construction, are provided with obliquely disposed cross bars 8, said bars extending from the outer sides of the respective links inwardly on converging lines toward the middle of the chain. The central cross bars of the links 3 are disposed at the center of the tread of the tire and extend at right angles to their link sides, thus securing a desired gripping action for propulsion, while the obliquely disposed links 8 are disposed on opposite sides of the tread and operate not only to secure a gripping action for propulsion but also oppose a resistance to skidding and sluing.

The links 5 are also of oblong rectangular form and correspond in construction with the links 4, but are disposed so that their longitudinal centers extend on lines between the sides of the link 3 and the adjacent sides of the links 4, the said links 3, 4 and 5 thus being staggered with relation to each other. The links 5 are provided with diagonal or oblique cross bars 9 which are arranged to track partially in the path of the bar 7 and partially in the path of the bars 8 and are staggered with relation to said bars, thus securing a diagonal gripping action at points between the center and sides of the tread to further promote the gripping efficiency of the chain and at the same time further diminish any tendency to skidding or sluing.

The terminal cross bars 10 and 11 of the links 3 and 4 are deflected outwardly or radially with respect to the tread and to the side bars of said links so as to lie slightly beyond the surface of the tire, and the cross bars 12 of the links 5 extend across the outer surfaces of the adjacent longitudinal bars of the links 3 and 4, while the longitudinal bars of said links 5 extend under the cross bars 10 and 11 of the links 3 and 4, whereby the link members 5 are arranged to engage the longitudinal bars of the link member 3 and the inner longitudinal bars of the link members 4, while the cross bars 10 of the link member 3 engage the inner longitudinal bars of the link members 5, whereby said link members are pivotally united, the outer longitudinal bars of the side link members 4 being engaged by eyes 13 at the ends of the link members 6, which are in the form of straight longitudinal link bars, thus coupling all the link members together for free pivotal action. By the described construction and mode of coupling the link bars, the bars are permitted to have radial pivotal motion to a high degree to compensate for the radial motion of the tire in passing over irregular surfaces, the pivotal connections also permitting the rows to have pivotal motion transversely of the tire in the event that the tire is deflected laterally, thus diminishing wear and tear upon the tire to a material degree.

At determined intervals chain tightening and loosening devices 14 are provided in place of the links 6. Each of these chain tightening and loosening devices consists of a pair of link members 15 and 16, which are respectively coupled at their relatively remote ends to the ends of adjacent links 4 and are detachably and adjustably connected at their proximate ends. To this end, the link member 15 is formed with a substantially straight cross bar 17, and the link member 16 is provided with a doubled or reversely bent portion 18 forming a hook which passes through the link 15 and backwardly over the cross bar 17, thus detachably coupling said link members 15 and 16 together. The link members 15 and 16 are coupled by means of a lever 19 pivotally connected with the cross bar on the hook 18, as indicated at 20, and having a downturned hook 21 to engage the cross bar 17. By the construction described the lever 19 may be thrown backwardly from a normal position shown in Figs. 2 and 3 to a position on the other side of its pivot, for the purpose of moving the link members 15 and 16 toward one another, thus adapting them to be uncoupled, the construction being, however, such that when the lever is in the normal position disclosed the pull of the link member on the hook 21 will hold the lever 19 in normal position. The construction described adapts the link members 15 and 16 to be initially united and then drawn together and locked to tighten the chain of adjacent portions thereof about the tire, allowing the chain to be applied in a normally slack position and then tightened up to the desired degree to grip the tire. By placing these chain tightening and slackening devices at proper intervals along the grip chain, it will be obvious that any number of chain sections may be coupled to make the chain of a proper size to fit any diameter of tire within certain limits, and that such construction also adapts the chain sections to be firmly locked and the chain simultaneously tightened upon the tire.

It will be seen that when the chain is applied it will cover both the center and sides of the tread and form a wide range of gripping action across the tire, and that the arrangement of the right angular and obliquely disposed gripping bars is such as to secure an effective degree of gripping engagement with the ground at all points where the tire contacts with the ground, while preventing or diminishing to a very high degree skidding or sluing of the vehicle wheel. Other advantages of the invention will be apparent to those versed in the art from the foregoing description.

Having thus fully described my invention, I claim:—

1. A tire chain grip comprising rows of transverse links, consisting of series of two rows of pivotally connected links arranged in alternation with each other, one of the rows comprising oblong rectangular links having both right angularly and obliquely disposed transverse grip bars, the obliquely disposed grip bars being arranged on opposite sides of the longitudinal center of the chain, and the other row of links including a pair of links of oblong rectangular form having obliquely disposed cross bars arranged on lines between and tracking the right angularly and obliquely disposed cross bars of the first named row, said links being flexibly coupled for a yielding action with the tire.

2. A tire grip chain comprising series of two rows of links, the links of one row comprising a central link of oblong rectangular form having a transversely disposed cross bar and side links of similar form having oblique cross bars converging toward the middle of the chain, and the links of the other row also being of oblong rectangular form and pivotally coupled to the adjacent cross bars of the first named links, said links of the second row being arranged on lines between the centers of the central and side links of the first row and being provided with obliquely disposed grip bars converging toward the middle of the chain and arranged to track the cross bars of the central and side links of the first row of links, said links being pivotally coupled for a yielding action, and link rods at the sides of the second named row pivotally engaging the outer longitudinal bars of adjoining links of the first named rows.

In testimony whereof I affix my signature.

FRANK F. GRIFFIN.